US010683590B2

(12) United States Patent
Lian et al.

(10) Patent No.: US 10,683,590 B2
(45) Date of Patent: Jun. 16, 2020

(54) GRAPHENE FIBER AND METHOD OF MANUFACTURING SAME

(71) Applicant: Rensselaer Polytechnic Institute, Troy, NY (US)

(72) Inventors: Jie Lian, Niskayuna, NY (US); Guoqing Xin, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 280 days.

(21) Appl. No.: 15/744,509

(22) PCT Filed: Jul. 18, 2016

(86) PCT No.: PCT/US2016/042749
§ 371 (c)(1),
(2) Date: Jan. 12, 2018

(87) PCT Pub. No.: WO2017/011828
PCT Pub. Date: Jan. 19, 2017

(65) Prior Publication Data
US 2018/0209075 A1    Jul. 26, 2018

Related U.S. Application Data

(60) Provisional application No. 62/193,263, filed on Jul. 16, 2015.

(51) Int. Cl.
*D01F 9/12* (2006.01)
*D01D 5/06* (2006.01)
(Continued)

(52) U.S. Cl.
CPC .............. *D01F 9/12* (2013.01); *C01B 32/174* (2017.08); *C01B 32/184* (2017.08); *D01D 5/04* (2013.01);
(Continued)

(58) Field of Classification Search
CPC ....... D01F 9/12; C01B 32/174; C01B 32/184; C01B 2204/26; C01B 2204/24; C01B 2204/22; C01B 32/182; C01B 32/198; C01B 2204/02; C01B 2204/04; C01B 2204/06; C01B 2204/065; C01B 2204/20; C01B 2204/28; C01B 2204/30; C01B 2204/32; D01D 10/02; D01D 5/04; D01D 5/06; C01P 2006/40; C01P 2006/32; C01P 2002/08
See application file for complete search history.

(56) References Cited

U.S. PATENT DOCUMENTS

2010/0028681 A1    2/2010   Dai et al.
2013/0272950 A1   10/2013   Yun et al.
(Continued)

FOREIGN PATENT DOCUMENTS

EP    2687626 A2    1/2014
EP    2698457 A2    2/2014

OTHER PUBLICATIONS

Biswas, et al., Multilayered Nano-Architecture of Variable Sized Graphene Nanosheets for Enhanced Supercapacitor Electrode Performance, Applied Materials & Interfaces 2010; 2(8): 2293-2300, with Supporting Information (Year: 2010).*
(Continued)

*Primary Examiner* — Daniel C. McCracken
(74) *Attorney, Agent, or Firm* — Murtha Cullina LLP; Anthony P. Gangemi

(57) ABSTRACT

Embodiments of the invention relate generally to graphene fibers and, more particularly, to graphene fibers comprising intercalated large-sized graphene oxide (LGGO)/graphene sheets and small-sized graphene oxide (SMGO)/graphene sheets having high thermal and electrical conductivities and high mechanical strength. In one embodiment, the invention provides a graphene fiber comprising: a plurality of intercalated graphene sheets including: a plurality of large-sized graphene sheets; and a plurality of small-sized graphene sheets, wherein at least one of the plurality of small-sized graphene sheets is disposed between at least two of the plurality of large-sized graphene sheets.

20 Claims, 8 Drawing Sheets

(51) Int. Cl.
  *C01B 32/174* (2017.01)
  *C01B 32/184* (2017.01)
  *D01D 5/04* (2006.01)
  *D01D 10/02* (2006.01)

(52) U.S. Cl.
  CPC ............... *D01D 5/06* (2013.01); *D01D 10/02* (2013.01); *C01B 2204/22* (2013.01); *C01B 2204/24* (2013.01); *C01B 2204/26* (2013.01); *C01P 2002/08* (2013.01); *C01P 2006/32* (2013.01); *C01P 2006/40* (2013.01); *D10B 2101/122* (2013.01)

(56) References Cited

U.S. PATENT DOCUMENTS

| 2014/0001417 | A1 | 1/2014 | Kim et al. | |
| 2014/0011027 | A1* | 1/2014 | Kim | D02J 13/00 |
| | | | | 428/367 |
| 2015/0038041 | A1 | 2/2015 | Zhamu et al. | |
| 2015/0064463 | A1* | 3/2015 | Wu | D01F 9/12 |
| | | | | 428/367 |
| 2015/0111449 | A1 | 4/2015 | Cruz-Silva et al. | |

OTHER PUBLICATIONS

Biswas et al., "Multilayered Nano-Architecture of Variable Sized Graphene Nanosheets for Enhanced Supercapacitor Electrode Performance", ACS Applied Materials & Interfaces, vol. 2, No. 8, pp. 2293-2300.

Du et al., "Fast electron transfer kinetic on electrodes composed of graphene oxide 'patched' with direct exfoliated pristine graphene nanosheets", Chemical Physics Letters 595-596 (2014) pp. 1-5.

Pan et al., "Graphene Nanoarchitectonics: Approaching the Excellent Properties of Graphene from Microscale to Macroscale", J Inorg Organomet Polym (2015) 25:179-188.

International Search Report and Written Opinion for PCT Application No. PCT/US2016/042749 dated Sep. 23, 2016, 8 pages.

* cited by examiner

GRAPHENE FIBER AND METHOD OF MANUFACTURING SAME

CROSS-REFERENCE TO RELATED APPLICATIONS

This application claims the benefit of U.S. Provisional Patent Application Ser. No. 62/193,263, filed 16 Jul. 2015, which is hereby incorporated herein as though fully set forth.

BACKGROUND OF THE INVENTION

Embodiments of the invention relate generally to graphene fibers and, more particularly, to graphene fibers comprising intercalated large-sized graphene oxide (LGGO)/graphene sheets and small-sized graphene oxide (SMGO)/graphene sheets having high thermal and electrical conductivities and high mechanical strength.

Single-layer graphene has the highest thermal conductivity ever reported (up to 5,000 $Wm^{-1}K^{-1}$ at room temperature), Young's modulus (~1,100 GPa), fracture strength (130 GPa), and mobility of charge carriers (200,000 $cm^2V^{-1}s^{-1}$). These properties, however, are on a molecular level and have not been achievable when incorporated into graphene fibers.

Macroscopic graphene oxide (GO) fibers can be assembled from a dispersion of GO in aqueous media, with graphene fibers produced upon reduction of the GO fibers. The anisotropic liquid crystalline behavior of the GO sheets can lead to a pre-aligned orientation which can further be directed under shear flow to form an ordered assembly in a macroscopic fiber structure via a simple and cost-effective wet spinning process. Improvement of the mechanical properties of the GO fibers and graphene fibers can be achieved by introducing metal ion cross-linking bonds between graphene/GO sheets or by forming graphene/GO-based composite fibers (e.g., by adding carbon nanotubes).

GO fibers are typically electrically insulating. Electrical conductivity can be recovered on the order of $10^4$ S/cm upon thermal or chemical reduction and can be further increased to about $9.3 \times 10^4$ S/m through doping with silver nanowires. The reported mechanical and electrical properties of graphene fibers, however, are orders of magnitude lower than those of single-layer graphene and are significantly inferior to commercialized carbon fibers and carbon nanotube fibers.

To date, it has been difficult to simultaneously achieve high mechanical and superior thermal and/or electrical conductivity properties in graphene fibers. Highly aligned $sp^2$ graphene sheets are required for high thermal or electrical transport, in which case the mechanical strength is primarily due to van der Waals interaction between graphene sheets. At the same time, heterogeneous structures, including functional groups and $sp^3$ bonds in cross-linked graphene nanosheets necessary to improve mechanical strength act as phonon and electron scattering centers, reducing electrical and thermal conductivities.

BRIEF DESCRIPTION OF THE INVENTION

In one embodiment, the invention provides a graphene fiber comprising: a plurality of intercalated graphene sheets including: a plurality of large-sized graphene sheets; and a plurality of small-sized graphene sheets, wherein at least one of the plurality of small-sized graphene sheets is disposed between at least two of the plurality of large-sized graphene sheets.

In another embodiment, the invention provides a method of manufacturing a graphene fiber with aligned structures, the method comprising: mixing a quantity of an aqueous dispersion of large-sized graphene oxide (LGGO) and a quantity of an aqueous dispersion of small-sized graphene oxide (SMGO); spinning the mixed LGGO/SMGO dispersions to form a graphene oxide (GO) fiber; and annealing the GO fiber at high temperatures for carbonization and graphitization to form a graphene fiber.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

In contrast to the conventional approach, whereby only large-sized graphene oxide (LGGO) is believed capable of obtaining favorable electrical and mechanical properties due to its greater aspect ratio, Applicant has developed a novel fiber structure comprising intercalated LGGO sheets and small-sized GO (SMGO) sheets. In this fiber structure, LGGO sheets form a highly aligned backbone and SMGO sheets fill the spaces and voids between the LGGO sheets without altering their alignment. By varying the proportion of LGGO and SMGO sheets, an optimal balance between compactness and sheet alignment can be reached for any number of applications.

Upon carbonization and high temperature graphitization, an ordered, mechanically-strong graphene fiber is obtained having high thermal and electrical conductivities. In some embodiments of the invention comprising about 30 wt % SMGO sheets, tensile strengths of 1080 (±61) MPa, thermal conductivities up to 1290 (±53) $Wm^{-1}K^{-1}$ and electrical conductivities up to 2.21 (±0.06)×$10^5$ S/m were achieved following thermal annealing at 2850° C. These represent significant improvements over graphene fibers prepared from LGGO sheets alone.

Figure 1:
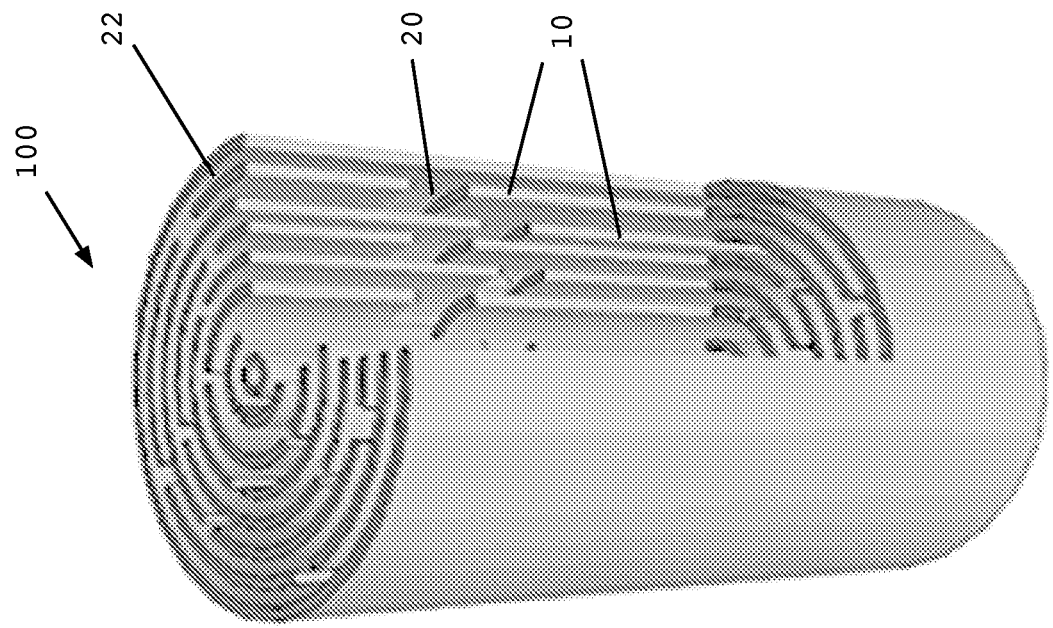
FIG. 1 shows a schematic perspective view of a portion of a known graphene fiber.

FIG. 1 shows a perspective view of a portion of a graphene fiber 100 that has been cut to show its cross-sections. As can be seen, a plurality of large-size graphene sheets 10 are arranged in concentric layers. Spaces 20 between adjacent large-size graphene sheets 10 in the same layer and voids 22 between the layers of large-size graphene sheets 10 contribute to the relatively poor thermal and electrical conductivities of graphene fibers composed only of large-size graphene sheets. Spaces 20 and voids 22 are principally induced by the contraction of adjacent large-size graphene sheets 10 and the removal of oxygen functional groups and gaseous $H_2O$, CO, and $CO_2$ during thermal annealing.

Figure 2:
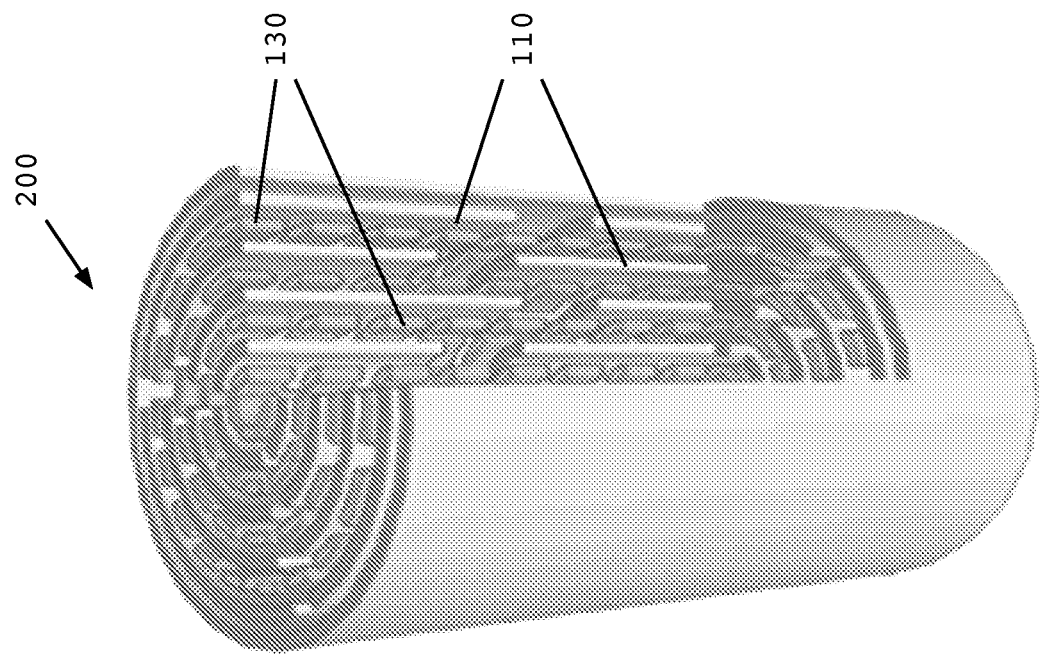
FIG. 2 shows a schematic perspective view of a portion of a graphene fiber according to an embodiment of the invention.

FIG. 2 shows a similar view of a portion of a graphene fiber 200 according to an embodiment of the invention. As can be seen, a plurality of small-size graphene sheets 130 are intercalated with the large-size graphene sheets 110, thereby reducing the spaces (FIG. 1) and voids 22 (FIG. 2) between adjacent large-size graphene sheets 110. This increases both the tensile strength and Young's modulus of graphene fiber 200 while also increasing both its thermal conductivity and electrical conductivity.

Graphene fibers according to embodiments of the invention may be formed according to a number of methods. Generally, however, these include (1) the mixing of aqueous LGGO and SMGO dispersions and heating the mixture to evaporate water and concentrate the mixed GO dispersion, (2) wet-spinning the mixed GO dispersion, and (3) annealing the resulting GO fibers at high temperature.

For example, according to one embodiment of the invention, LGGO was prepared from graphite powders following a modified Hummers' method, as is known in the art. The LGGO was then expanded at 750 W by microwave irradiation at 90 seconds to obtain a worm-like expanded graphite. The expanded graphite powder (5 g), concentrated $H_2SO_4$ (300 mL), $K_2S_2O_8$ (4.2 g), and $P_2O_5$ (6.2 g) were added successively into a 500 mL flask and the mixture kept at 80° C. for 24 hours.

After cooling to room temperature, the mixture was diluted with de-ionized (DI) water then vacuum-filtered and washed with DI water until pH neutral. The expanded graphite powder was then dried in air at room temperature for two days. After drying, the expanded graphite (5 g) was added to a mixture containing concentrated $H_2SO_4$ (115 mL) and NaNO3 (2.5 g) in an ice bath (0° C.). Potassium permanganate ($KMnO_4$) was then added to the solution and maintained for 30 minutes at 35° C., followed by a slow addition of DI water (230 mL). The temperature of the reaction was maintained at 98° C. for 15 minutes.

Additional DI water (355 mL) containing $H_2O_2$ (3 wt %, 50 mL) was added and the solid obtained from centrifugation (3200 rpm for 5 minutes) was washed with excess DI water, 20 vol % HCl, and ethanol. The washing process was repeated for several times until the pH of the solution reached neutral and to obtain a concentrated LGGO dispersion.

To obtain the SMGO, the diluted LGGO dispersion was sonicated by a tip (bar type) sonication instrument at 500 W for one hour. Then, 5 mL of each of the LGGO and SMGO dispersion were dried at 60° C. and weighted. The LGGO and SMGO dispersions were then mixed at varying proportions, as will be described in greater detail below, and heated to 120° C. to evaporate water and concentrate the mixed GO dispersion for fiber spinning.

Using a known wet-spinning protocol, a GO spinning solution (15 mg/mL) was injected into rotating hexadecyl-trimethyl ammonium bromide or calcium chloride coagulation baths from a plastic syringe. After a 30-minute immersion in the coagulation baths, GO gel fibers were washed with DI water and suspended over two parallel rods in the air to dry for one hour. During drying, the fiber lengths shrank and a tension was generated within the fiber.

Finally, the spun GO fibers were fixed on a graphite fixture and annealed using an electrical furnace. Various samples were heated up from room temperature to various temperatures (1400, 1600, 1800, 2000, 2200, 2500, and 2850° C.) at a rate of 1000° C./h and maintained at temperature for one hour in a flow of argon.

Figure 3:
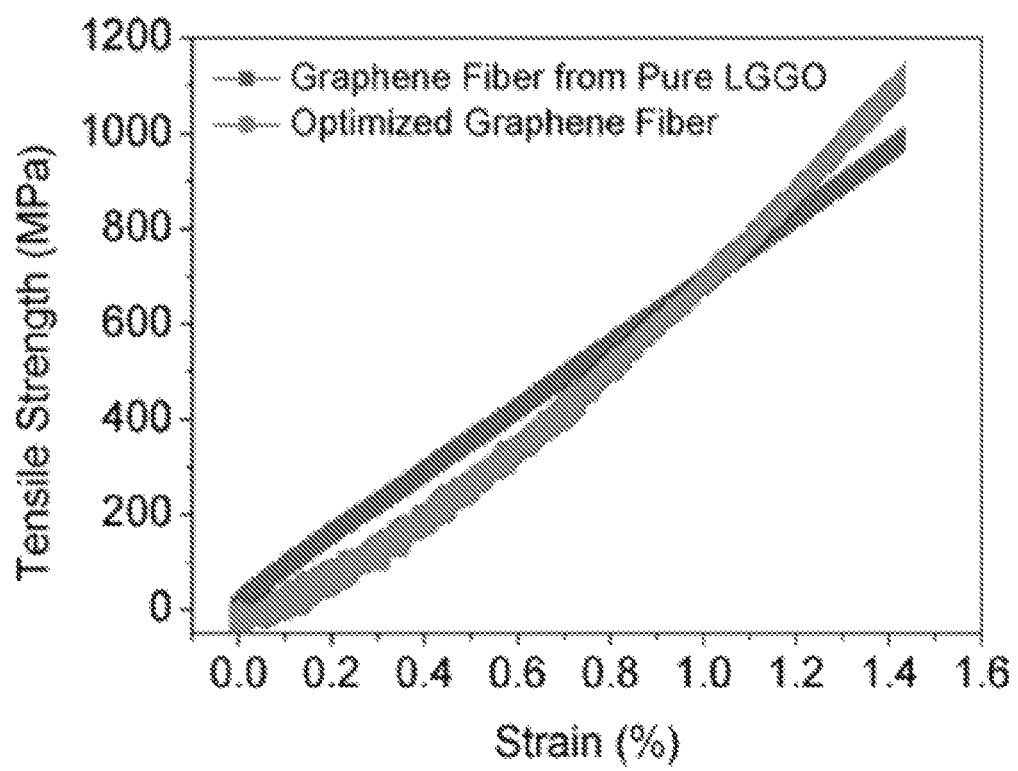
FIG. 3 shows a graph of the comparative mechanical strengths of a known graphene fiber and a graphene fiber according to an embodiment of the invention.

The relative proportions of LGGO and SMGO may be varied to optimize the desired properties of the resulting graphene fibers according to various embodiments of the invention. FIG. 3, for example, shows the comparative mechanical strengths on a typical stress-strain curve of a graphene fiber prepared from LGGO only (annealed at 1600° C.) and a graphene fiber with 30 wt % SMGO (annealed at 1800° C.).

Figure 5:
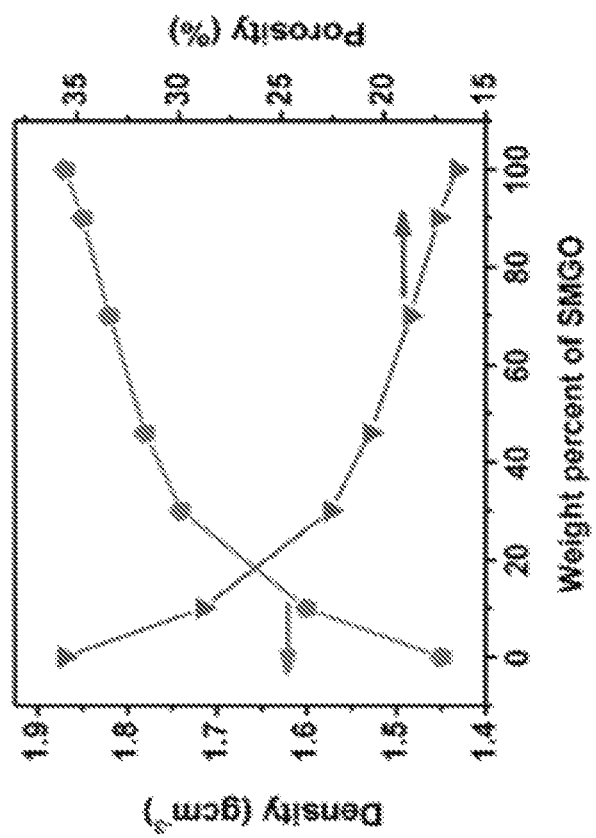
FIG. 5 shows a graph of the densities and porosities of graphene fibers prepared using various proportions of SMGO according to various embodiments of the invention.
Figure 4:
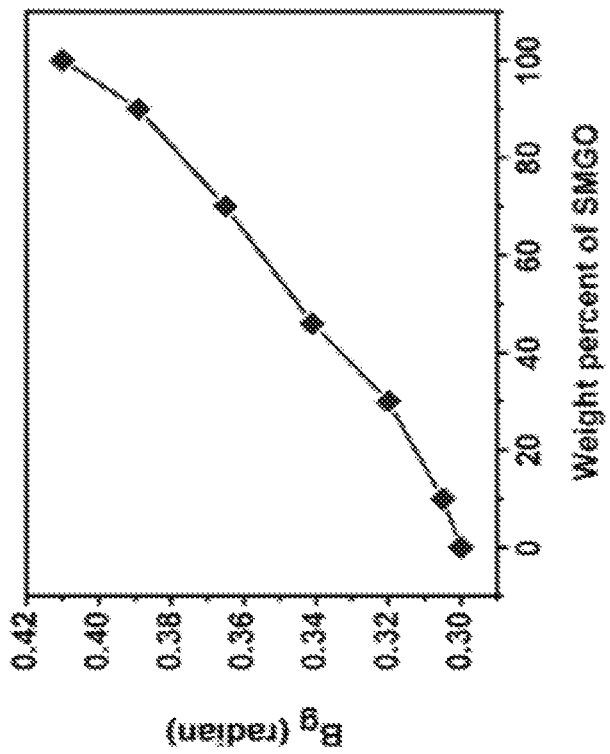
FIG. 4 shows a graph of the misalignment of graphene sheets in a graphene fiber prepared using various proportions of small-size graphene oxide (SMGO) according to various embodiments of the invention.

Increasing proportions of SMGO resulted in an increasing misalignment of graphene sheets with respect to the graphene fiber axes, as shown in FIG. 4, which reflects the properties of graphene fibers annealed at 1800° C. according to various embodiments of the invention. Similarly, increasing proportions of SMGO resulted in an increase in overall density and a decrease in porosity, as shown in FIG. 5, also reflecting the properties of graphene fibers annealed at 1800° C. according to various embodiments of the invention.

Figure 6:
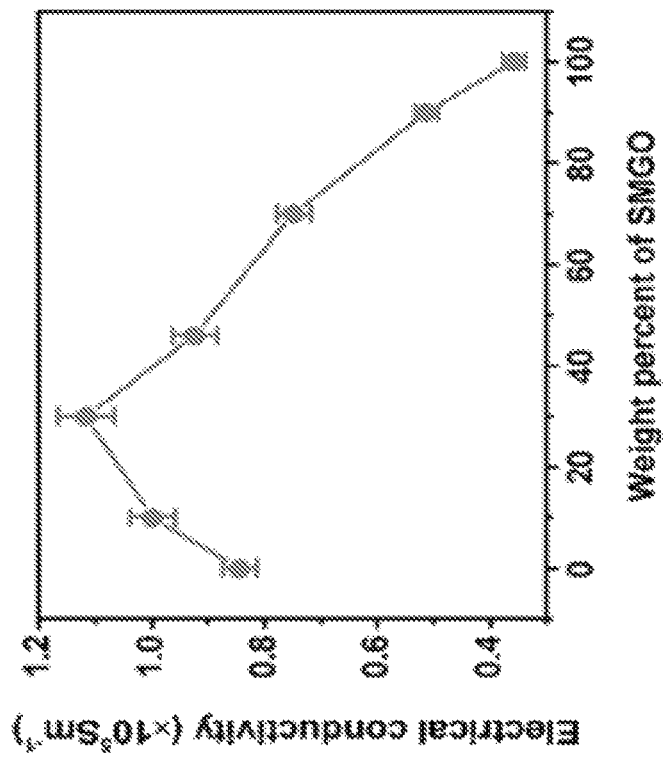
FIG. 6 shows a graph of the thermal conductivities of graphene fibers prepared using various proportions of SMGO according to various embodiments of the invention.
Figure 7:
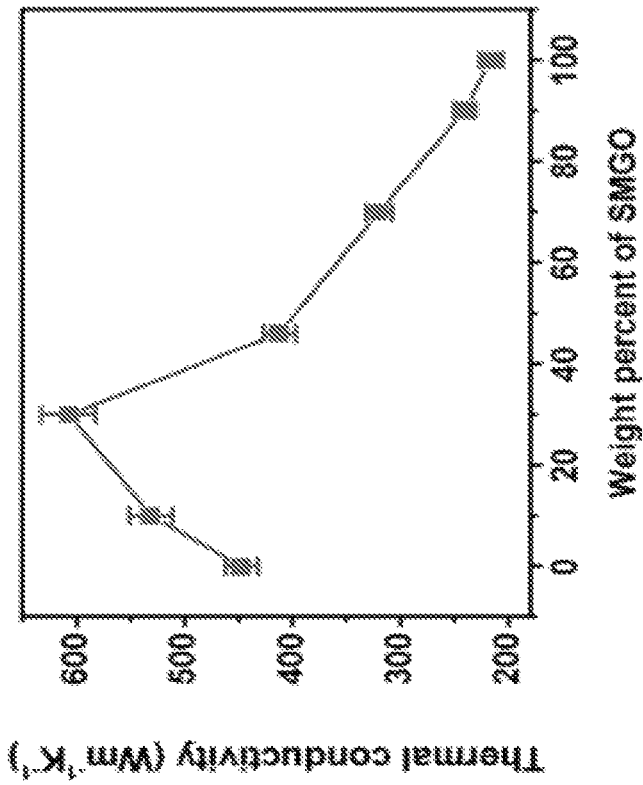
FIG. 7 shows a graph of the electrical conductivities of graphene fibers prepared using various proportions of SMGO according to various embodiments of the invention.

Increasing proportions of SMGO resulted in an early increase in both thermal and electrical conductivity. Applicant found, however, that the both conductivities increase up until about 30 wt % SMGO. Above 30 wt % SMGO, both thermal and electrical conductivities decrease, as shown in FIGS. 6 and 7, respectively. This is despite a continuous reduction of porosity (FIG. 5) and attributable to an increase in defective boundaries and attendant degradation of the physical properties of the graphene fiber due to increasing misalignment of the graphene sheets (FIG. 4).

Figure 8:
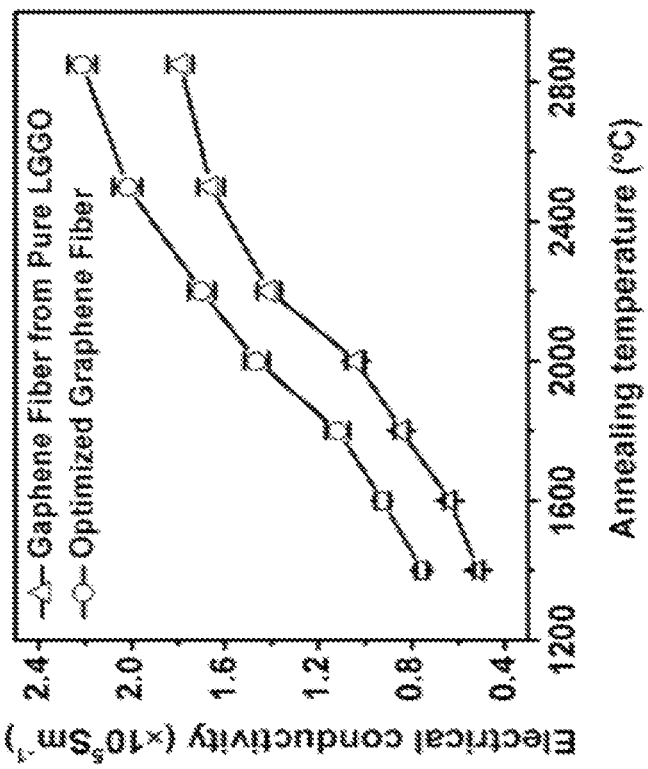
FIG. 8 shows a graph of the comparative thermal conductivities of known graphene fibers and graphene fibers annealed at various temperatures according to various embodiments of the invention.
Figure 9:
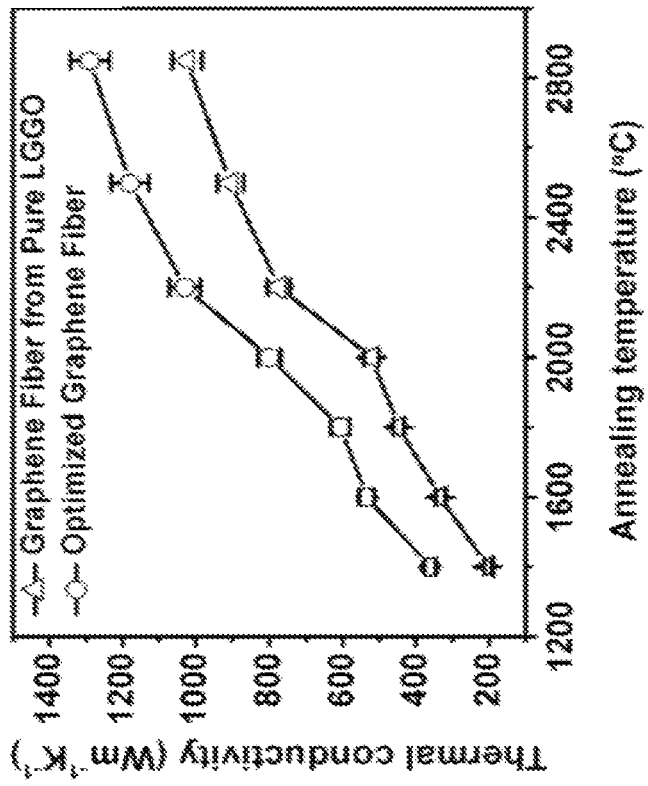
FIG. 9 shows a graph of the comparative electrical conductivities of known graphene fibers and graphene fibers annealed at various temperatures according to various embodiments of the invention.

The mechanical and conductive properties of the graphene fibers can be further optimized based on the annealing temperature. For example, FIG. 8 shows the comparative thermal conductivities of a graphene fiber formed only from LGGO and a 30 wt % SMGO graphene fiber according to an embodiment of the invention. FIG. 9 shows the comparative electrical conductivities for the same graphene fibers. As can be seen in FIGS. 8 and 9, both conductivities increase with increasing annealing temperature, but were consistently higher for Applicant's 30 wt % SMGO graphene fiber.

The maximum thermal and electrical conductivities for the LGGO-only graphene fiber were 1025 (±40) $Wm^{-1}K^{-1}$ and 1.79 (±0.06)×10$^5$ S/m, respectively. The maximum values for Applicant's 30 wt % SMGO graphene fiber, however, were 1290 (±53) $Wm^{-1}K^{-1}$ and 2.21 (±0.06)×10$^5$ S/m, respectively. However, lower annealing temperatures (e.g., 2000° C. to 2200° C.) can be employed to improve the cost effectiveness of the process while still achieving thermal conductivities (about 800-1030 $Wm^{-1}K^{-1}$) comparable to that of the best known mesophase pitch-based carbon fibers.

Figure 10:
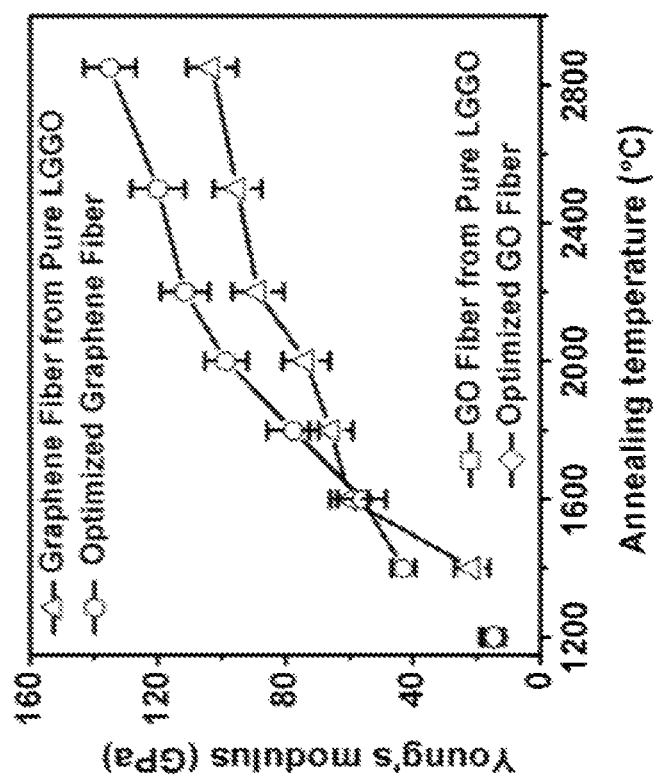
FIG. 10 shows a graph of the comparative tensile strengths of known graphene fibers and graphene fibers annealed at various temperatures according to various embodiments of the invention.
Figure 11:
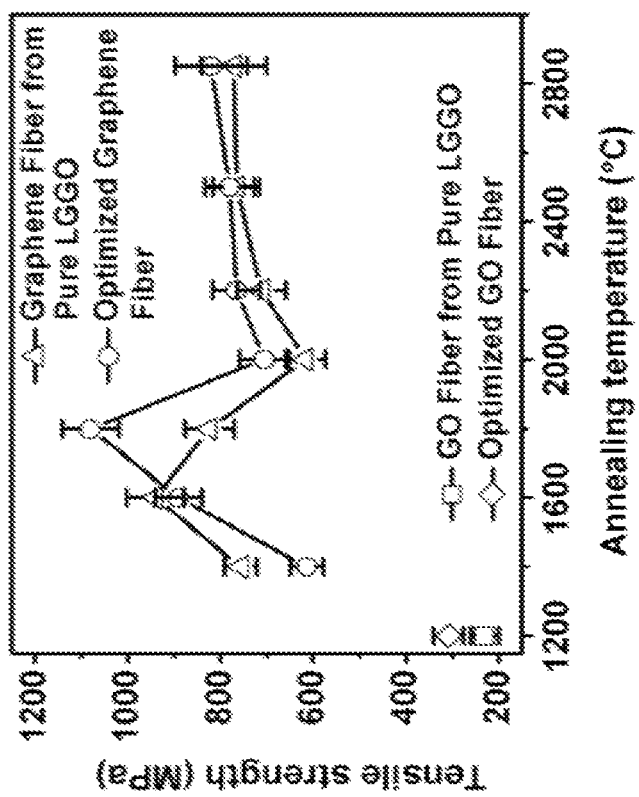
FIG. 11 shows a graph of the comparative Young's modulus values of known graphene fibers and graphene fibers annealed at various temperatures according to various embodiments of the invention.

The mechanical properties were affected differently by annealing temperature. FIGS. 10 and 11 show, respectively, the tensile strength and Young's modulus for the LGGO-only and 30 wt % SMGO graphene fibers of FIGS. 8 and 9. Before annealing, the tensile strengths of the LGGO-only and 30 wt % SMGO graphene fibers were 231±30 MPa and 308±32 MPa, respectively. For the LGGO-only graphene fiber, tensile strength increased with increasing annealing temperature to 1600° C. then decreased to between 616 MPa and 823 MPa at temperatures above 1800° C.

The 30 wt % SMGO graphene fiber exhibited an increase in tensile strength with increasing annealing temperature until reaching 1080±61 MPa at 1800° C. and then showed a similar decrease to between 705 MPa and 820 MPa at annealing temperatures above 2000° C.

The higher tensile strengths of the graphene fibers at lower annealing temperatures can be attributed to the enhancement in the alignment and densification with substantial cross-linking retained. As the annealing temperature increases, however, the cross-linking functional groups are removed, leading to a reduction in tensile strength. At higher annealing temperatures, the interlayer graphene sliding is primarily dominated by van der Waals force interactions between adjacent graphene sheets.

For both fibers, Young's modulus showed a steady increase with increasing annealing temperature, although values for the 30 wt % SMGO fiber were higher at most annealing temperatures. A maximum value of about 135±8 GPa at 2850° C. was achieved for the 30 wt % SMGO fiber, as compared to about 100 GPa for the LGGO-only graphene fiber.

This increase in Young's modulus with increasing annealing temperature is consistent with previously described polyacrylonitrile (PAN) and mesophase pitch-based carbon fibers and can be primarily attributed to improvement of the graphene sheet alignment and an increased dimension of crystallite domains along both transverse and longitudinal directions. The intercalation of large-sized and small-sized graphene sheets in the 30 wt % SMGO fiber, however, leads to a greater tensile strength and Young's modulus.

For graphene-based materials, heat conduction is dominated by phonon transport from lattice vibrations of the covalent $sp^2$ bonding network and electron transport is largely determined by the delocalized π-bond over the entire graphene sheet. Upon thermal reduction, the lattice vacancies and the residual functional groups on graphene sheets create substantial numbers of phonon and electron scattering centers, significantly degrading thermal and electrical properties.

High-temperature annealing heals defects in the lattice structure and removes oxygen functional groups and significantly increases the size of the $sp^2$ domains. The crystallite sizes in parallel and perpendicular directions to the fiber axis have been calculated from the integrated intensity ratios of the D-band (1350 $cm^{-1}$) and the G-band (1581 $cm^{-1}$) based on polarized Raman spectra of the 30 wt % SMGO graphene fibers annealed at different temperatures. At lower annealing temperatures (e.g., 1800° C.), graphene fibers demonstrate smaller-sized $sp^2$ domains (~40-50 nm) with residual defects.

Figure 12:
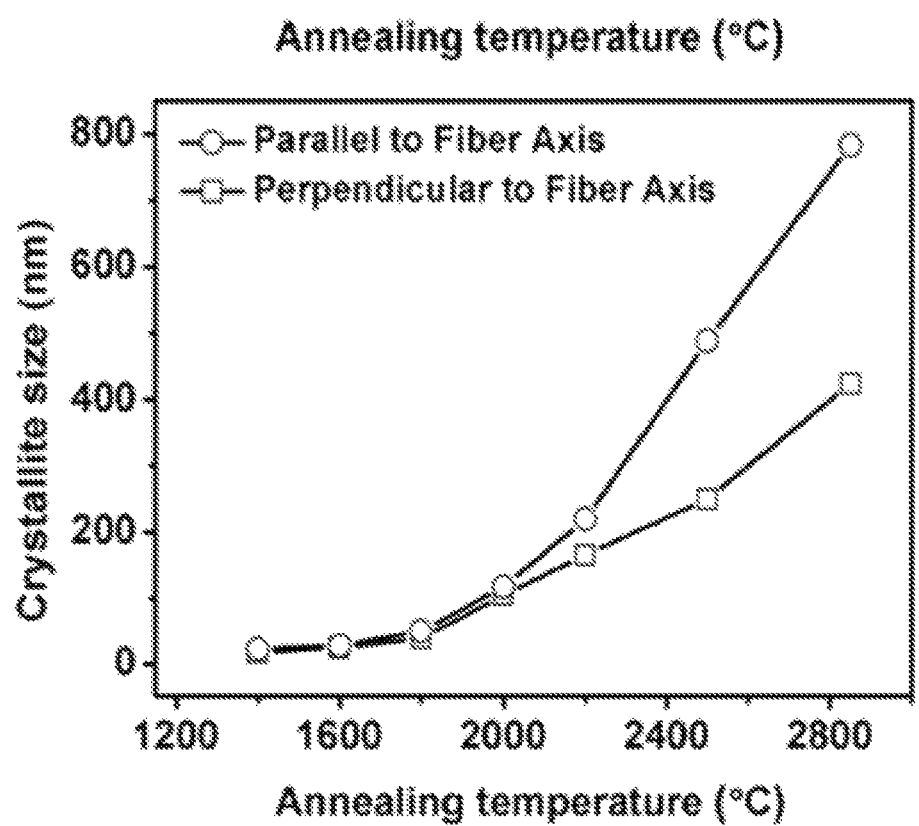
FIG. 12 shows a graph of crystallite size of graphene sheets parallel and perpendicular to the fiber axis at various annealing temperatures according to various embodiments of the invention.

In graphene fibers according to embodiments of the invention, the domain sizes in both longitudinal and transverse directions increase dramatically with increasing annealing temperature and approaches 783 nm and 423 nm, respectively, at 2850° C., as shown in FIG. 12. These values are orders of magnitude larger than the nanocrystalline graphitic domains (several tens of nm) inside mesophase pitch-based and PAN-based carbon fibers. Despite less-dense structures, the greatly-reduced phonon scattering from boundary/interface due to the orders of magnitude larger crystalline graphene sheets enables more efficient phonon transport and thus, enhanced thermal conductivity. The graphene fibers of the invention therefore have great potential as thermal management materials in high-power electronics and reinforcing components for high-performance composite materials.

Figure 13:
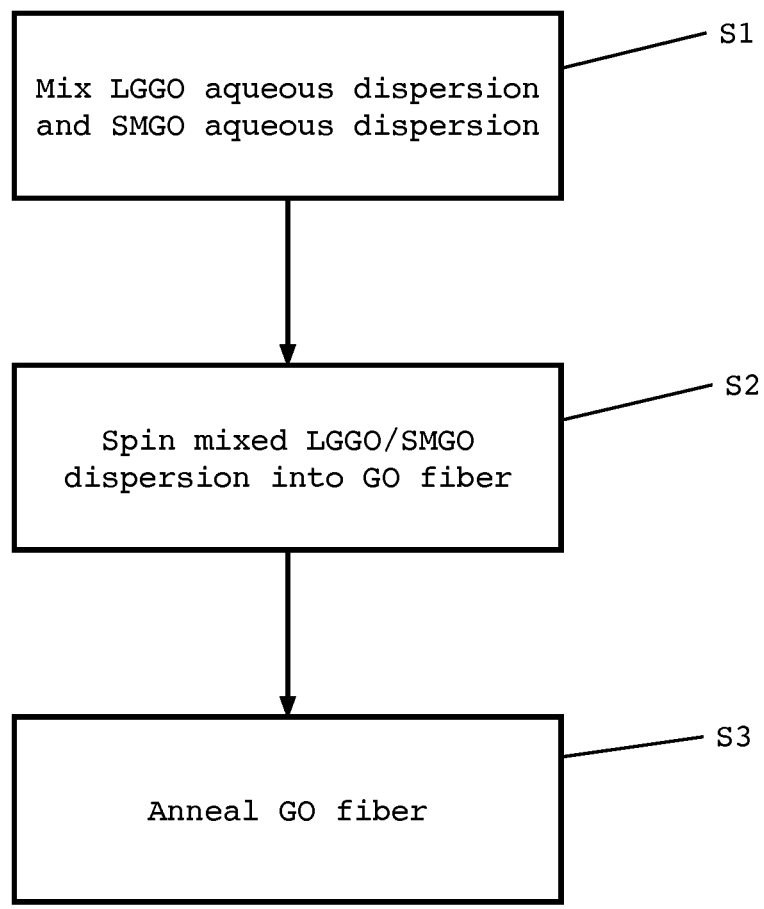
FIG. 13 shows a flow diagram of a method according to an illustrative embodiment of the invention.

FIG. 13 shows a flow diagram of a method according to an illustrative embodiment of the invention. At S1, an LGGO dispersion and an SMGO dispersion are mixed in various proportions, as described above, for example. At S2, the mixed LGGO/SMGO dispersion is spun to form a GO fiber using, for example, a wet-spinning technique. Any or all of the LGGO dispersion, the SMGO dispersion, or the LGGO/SMGO dispersion may include, as a solvent, water and/or a compatible organic solvent. Suitable organic solvents will be apparent to one skilled in the art. According to some embodiments of the invention, compatible organic solvents may include one or more solvent selected from a group consisting of: N-Methyl-2-pyrrolidone and dimethylformamide.

At S3, the GO fiber is annealed at high temperature to form a graphene fiber by carbonization and graphitization processes according to embodiments of the invention, as described above. Also as noted above, the particular mechanical and conductive properties of the graphene fibers according to the invention may be optimized for particular applications by varying the relative proportion of SMGO and/or the annealing temperature employed.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A graphene fiber comprising:
   a plurality of intercalated graphene sheets including:
      a plurality of large-sized graphene sheets; and
      a plurality of small-sized graphene sheets,
   wherein at least one of the plurality of small-sized graphene sheets is disposed between at least two of the plurality of large-sized graphene sheets.

2. The graphene fiber of claim 1, wherein each of the plurality of large-sized graphene sheets is between about 1 μm and about 100 μm in at least one dimension.

3. The graphene fiber of claim 2, wherein each of the plurality of large-sized graphene sheets is between about 10 μm and about 50 μm in at least one dimension.

4. The graphene fiber of claim 3, wherein each of the plurality of large-sized graphene sheets is between about 20 μm and about 30 μm in at least one dimension.

5. The graphene fiber of claim 1, wherein each of the small-sized graphene sheets is between about 20 nm and about 5 μm in at least one dimension.

6. The graphene fiber of claim 5, wherein each of the small-sized graphene sheets is between about 0.1 μm and about 2 μm in at least one dimension.

7. The graphene fiber of claim 6, wherein each of the small-sized graphene sheets is between about 0.5 μm and about 1 μm in at least one dimension.

8. The graphene fiber of claim 1, wherein the plurality of small-sized graphene sheets comprises between about 10 wt % and about 30 wt % of the graphene fiber.

9. The graphene fiber of claim 1, wherein the graphene fiber has a thermal conductivity between about 500 Wm-1K-1 and about 1340 Wm-1K-1.

10. The graphene fiber of claim 1, wherein the graphene fiber has an electrical conductivity between about 0.9×105 S/m and about 2.25×105 S/m.

11. The graphene fiber of claim 1, wherein the graphene fiber has a tensile strength between about 600 MPa and about 1140 MPa.

12. The graphene fiber of claim 1, wherein the graphene fiber has a Young's modulus between about 40 GPa and about 140 GPa.

13. A method of manufacturing a graphene fiber with aligned structures, the method comprising:

mixing a quantity of a dispersion of large-sized graphene oxide (LGGO) and a quantity of a dispersion of small-sized graphene oxide (SMGO);

spinning the mixed LGGO/SMGO dispersions to form a graphene oxide (GO) fiber; and annealing the GO fiber at high temperatures for carbonization and graphitization to form a graphene fiber.

14. The method of claim 13, wherein mixing includes mixing the LGGO dispersion and the SMGO dispersion at proportions of between about 70 wt % and about 90 wt % LGGO dispersion and between about 30 wt % and about 10 wt % SMGO dispersion.

15. The method of claim 13, wherein mixing includes mixing the LGGO dispersion and the SMGO dispersion at a proportion of about 70 wt % LGGO dispersion and about 30 wt % SMGO dispersion.

16. The method of claim 13, wherein the LGGO dispersion includes LGGO sheets of between about 1 μm and about 100 μm in at least one dimension.

17. The method of claim 13, wherein the SMGO dispersion includes SMGO sheets of between about 20 nm and about 5 μm in at least one dimension.

18. The method of claim 13, wherein spinning includes wet-spinning and dry-spinning.

19. The method of claim 13, wherein annealing includes annealing the GO fiber at a temperature between about 1400° C. and about 3000° C.

20. The method of claim 13, wherein any or all of the LGGO dispersion, the SMGO dispersion, or the LGGO/SMGO dispersion includes as a solvent water and/or a compatible organic solvent selected from a group consisting of: N-Methyl-2-pyrrolidone and dimethylformamide.

* * * * *